United States Patent
Han et al.

(10) Patent No.: US 8,926,794 B2
(45) Date of Patent: Jan. 6, 2015

(54) PROCESS OF EXTRACTION OF HEMICELLULOSE FROM CORN FIBER

(75) Inventors: Xian-Zhong Han, Hoffman Estates, IL (US); Rohit A. Medhekar, Hoffman Estates, IL (US); Andrew J. Hoffman, Hoffman Estates, IL (US)

(73) Assignee: Tate & Lyle Ingredients Americas LLC, Hoffman Estates, IL (US)

( * ) Notice: Subject to any disclaimer, the term of this patent is extended or adjusted under 35 U.S.C. 154(b) by 12 days.

(21) Appl. No.: 13/541,433

(22) Filed: Jul. 3, 2012

(65) Prior Publication Data
US 2013/0174993 A1    Jul. 11, 2013

Related U.S. Application Data

(60) Provisional application No. 61/505,373, filed on Jul. 7, 2011.

(51) Int. Cl.
| | |
|---|---|
| *D21C 3/04* | (2006.01) |
| *C08B 37/00* | (2006.01) |
| *C08L 5/16* | (2006.01) |
| *C08B 30/10* | (2006.01) |

(52) U.S. Cl.
CPC ............. *D21C 3/04* (2013.01); *C08B 37/0057* (2013.01); *C08L 5/16* (2013.01); *C08B 30/10* (2013.01)
USPC ........................................................ 162/14

(58) Field of Classification Search
None
See application file for complete search history.

(56) References Cited

U.S. PATENT DOCUMENTS

| | | | |
|---|---|---|---|
| 4,600,590 A | 7/1986 | Dale | |
| 6,147,206 A | 11/2000 | Doner et al. | |
| 6,251,221 B1* | 6/2001 | Burkart | 162/5 |
| 2006/0233914 A1 | 10/2006 | Abbas et al. | |
| 2010/0196980 A1* | 8/2010 | Smith et al. | 435/161 |
| 2011/0226429 A1* | 9/2011 | Satyavolu et al. | 162/148 |

FOREIGN PATENT DOCUMENTS

| | | |
|---|---|---|
| EP | 2336195 A1 | 6/2011 |
| WO | 2007/120210 A2 | 10/2007 |

OTHER PUBLICATIONS

AOAC Official Method 991.42: Insoluble Dietary Fiber in Food and Food Products, AOAC Official Methods of Analysis, Cereal Foods, 1995, pp. 5-6, Chapter 32.
Beall et al, "Conversion of Hydrolysates of Corn Cobs and Hulls into Ethanol by Recombinant *Escherichia coli* B Containing Integrated Genes for Ethanol Production", Biotechnology Letters, 1992, pp. 857-862, vol. 14 No. 9.
Benko et al., "Heat Extraction of Corn Fiber Hemicellulose", Applied Biochemistry and Biotechnology, 2007, pp. 253-265, vol. 136-140.
Bradstreet, R.B., "Kjeldahl Method for Organic Nitrogen", Analytical Chemistry, 1954, pp. 185-187, vol. 26 No. 1.

(Continued)

*Primary Examiner* — Jacob Thomas Minskey
(74) *Attorney, Agent, or Firm* — McDonnell Boehnen Hulbert & Berghoff LLP

(57) ABSTRACT

A process of separating one or more components of corn fiber that comprises contacting the corn fiber with an extraction fluid that comprises at least one weak acid, increasing the temperature of the resulting mixture of fiber and fluid to solubilize hemicellulose of the corn fiber into the fluid, cooling the mixture, and separating the cooled extraction mixture into a soluble fraction comprising dissolved hemicellulose and an insoluble fraction comprising cellulose.

25 Claims, 3 Drawing Sheets

(56) References Cited

OTHER PUBLICATIONS

Bura et al., "Optimization of SO2—Catalyzed Steam Pretreatment of Corn Fiber for Ethanol Production", Applied Biochemistry and Biotechnology, 2003, pp. 319-335, vol. 105-108.

Chen et al., "Succinic Acid Production from Acid Hydrolysate of Corn Fiber by *Actinobacillus succinogenes*", Applied Biochemistry and Biotechnology, 2010, pp. 477-485, vol. 160.

Doner et al., "Isolation of Hemicellulose from Corn Fiber by Alkaline Hydrogen Peroxide Extraction", Cereal Chemistry, 1997, pp. 176-181, vol. 74 No. 2.

Doner et al., "An Improved Process for Isolation of Corn Fiber Gum", Cereal Chemistry, 1998, pp. 408-411, vol. 75 No. 4.

Doner et al., "Isolation and Characterization of Cellulose/Arabinoxylan Residual Mixtures from Corn Fiber Gum Processes", Cereal Chemistry, 2001, pp. 200-204, vol. 78 No. 2.

Fishman et al., "Characterization of Hemicellulose B from Corn Fiber by High-Performance Size Exclusion Chromatography with On-Line Molar Mass and Viscometric Detection", International Journal of Polymer Analysis and Characterization, 2000, pp. 359-379, vol. 5.

Goldstein et al., "Effects of Cellulosic Fibre on Physical and Rheological Properties of Starch, Gluten and Wheat Flour", International Journal of Food Science & Technology, 2010, pp. 1641-1646, vol. 45.

Grootaert et al., "Microbial Metabolism and Prebiotic Potency of Arabinoxylan Oligosaccharides in the Human Intestine", Trends in Food Science & Technology, 2007, pp. 64-71, vol. 18.

Hespell et al., "Hydrolysis by Commercial Enzyme Mixtures of AFEX-Treated Corn Fiber and Isolated Xylans", Applied Biochemistry and Biotechnology, 1997, pp. 87-97, vol. 62.

Lopez et al., "Effects of Soluble Corn Bran Arabinoxylans on Cecal Digestion, Lipid Metabolism, and Mineral Balance (Ca, Mg) in Rats", The Journal of Nutritional Biochemistry, 1999, pp. 500-509, vol. 10.

Marshall et al., "Ion Product of Water Substance, 0-1000 C, 1-10,000 Bars", Journal of Physical and Chemical Reference Data, 1981, pp. 295-304, vol. 10 No. 2.

Noureddini et al., "Dilute-Acid Pretreatment of Distillers' Grains and Corn Fiber", Bioresource Technology, 2010, pp. 1060-1067, vol. 101.

Osborn et al., "Corn Hull Hydrolysis Using Glucoamylase and Sulfuric Acid", Starch, 1984, pp. 393-395, vol. 36 No. 11.

Pirt et al., "The Determination of Starch by Acid Hydrolysis", Journal of the Science of Food and Agriculture, 1951, pp. 224-228, vol. 2.

Shibanuma et al., "Partial Acid Hydrolysis of Corn Fiber for the Production of L-Arabinose", Journal of Applied Glycoscience, 1999, pp. 249-256, vol. 46 No. 3.

Weil et al., "Pretreatment of Corn Fiber by Pressure Cooking in Water", Applied Biochemistry and Biotechnology, 1998, pp. 1-17, vol. 73.

Whistler et al., "Oligosaccharides from Partial Acid Hydrolysis of Corn Fiber Hemicellulose", Journal of the American Chemical Society, 1955, pp. 6328-6330, vol. 77.

Yadav et al., "Corn Fiber Gum: A Potential Gum Arabic Replacer for Beverage Flavor Emulsification", Food Hydrocolloids, 2007, pp. 1022-1030, vol. 21.

Yadav et al., "Corn Fiber Gum: New Structure/Function Relationships for this Potential Beverage Flavor Stabilizer", Food Hydrocolloids, 2009, pp. 1488-1493, vol. 23.

\* cited by examiner

PROCESS OF EXTRACTION OF HEMICELLULOSE FROM CORN FIBER

CROSS REFERENCE TO RELATED APPLICATIONS

The present application is non-provisional application claiming the benefit of U.S. Provisional Application No. 61/505,373, filed Jul. 7, 2011, which is incorporated herein by reference in its entirety.

FIELD OF THE INVENTION

The invention is generally related to the processing of milled corn. More specifically, the invention relates to extracting hemicellulose from corn fiber.

BACKGROUND OF THE INVENTION

The wet milling of corn in the United States of America produces over 4 million tons of corn fiber each year. To date, this corn fiber has been used in the United States of America in animal feed applications. Corn fiber comprises, among other things, hemicellulose, which is also referred to as corn fiber gum and arabinoxylans. Corn hemicellulose potentially has commercial value far exceeding its use in animal feed applications. For example, it is believed that corn hemicellulose may be used as replacement for gum Arabic in applications such as beverage flavor emulsification. Additionally, it is believed that corn hemicellulose may be useful in applications such as film formation, thickening, emulsification, and stabilization of aqueous solutions and suspensions. Further, it is known that including corn hemicellulose and its limited hydrolysis products, the arbinoxylan oligosaccharides (AXOS) that have a degree of polymerization (DP) of 3-10, in foods and beverages may yield health benefits such as increased absorption of calcium and magnesium, reduced cholesterol absorption, lowered plasma cholesterol, decrease cholesterol accumulation in the liver, and desirable bifidogenic effects.

In view of the number of possible relatively high value applications for corn hemicellulose, it is no surprise that processes of extracting hemicellulose from corn fiber on a commercial scale have been and continue to be the subject of investigation and development activities. For example, U.S. Pat. No. 6,147,206 (Donner et al.) discloses a process for obtaining high molecular weight hemicellulose that involves a treatment with hydrogen peroxide during or after treating milled corn fiber with an alkaline solution, which is often referred to as the "alkaline hydrogen peroxide" or "AHP" process. The hemicellulose produced by the AHP process is highly soluble in water. The yield of hemicellulose from the AHP process is known to be within a range of about 35 wt % (24 hours of extraction at 25° C.) to about 42 wt % (2 hours of extraction at 60° C.). Chromatographic analyses in conjunction with molar mass detection conducted on AHP end product revealed that a bimodal molar mass distribution having a high molecular weight component ($8.4$-$16.1 \times 10^5$ g/mole) and a low molecular weight component ($1.1$-$2.1 \times 10^5$ g/mole). White, fluffy cellulose/arabinoxylan mixtures (CAX) were generated from the solid residues remaining after corn fiber gum production. CAX contains a significant amount of sugars, as revealed from L-arabinose, D-xylose, and D,L-galactose levels. Even CAX prepared under extreme AHP conditions (e.g., 1 hour, 100° C.), contain a significant amount of sugars (e.g., about 33 wt %).

Another known process of extracting hemicellulose involves using hydrochloric acid or sulfuric acid. Such processes, however, result in significant hydrolysis to monomers such that the extracted product is primarily used for fermentation to ethanol or organic acids. For example, it has been reported that treating corn fiber with 1.0% sulfuric acid at 121° C. for 2 hours resulted in a total sugar yield of about 63.3 wt %.

Yet another known process of extracting hemicellulose from corn fiber is known as the ammonia-explosion (AFEX) process, which involves treating cellulose-containing materials with liquid ammonia to increase the chemical and biological reactivity of cellulose. More specifically, the AFEX process comprises (a) contacting cellulose-containing material with ammonia for less than one hour at a treatment pressure in the range of about 140 psia to about 180 psia, and at ambient temperature, (b) explosively reducing the pressure from the treatment pressure to atmospheric pressure, and (c) separating the ammonia from the cellulose-containing material, thereby increasing the digestibility of the cellulose in the cellulose-containing material and increasing the availability of protein from the fibers and from within the cell walls of the cellulose-containing material. After the AFEX process, the resulting corn fiber was subjected to enzymatic digestion with a combined mixture of commercial amylase, xylanase, and cellulase cellulose components for use in ethanol production. The digested material comprised about 30-40 wt % glucose and oligosaccharides.

Still another known process of extracting hemicellulose from corn fiber involves sequential $SO_2$-catalyzed steam explosion and enzymatic hydrolysis as part of an enzymatically mediated cellulose-to-ethanol process. The efficiency of converting the combination of cellulose and hemicellulose in corn fiber to monomeric sugars using a steam exploded fiber was as high as about 80%, whereas the conversion efficiency without the steam explosion before enzymatic hydrolysis was only about 15%.

Each of the foregoing known processes of extracting hemicellulose from corn fibers have limitations. High quality hemicellulose can be prepared by the treatment of combination of alkali and hydrogen peroxide. However, the cost of production is too high with alkali addition, acid neutralization, and ethanol precipitation. Sulfuric acid-based or hydrochloric acid-based extraction have been shown to cause extensive hydrolysis of hemicellulose to sugars, which tends to make the extracted material unsuitable as a high value product such as a gum replacer, a low-sugar natural soluble fiber, or low-sugar bulking agent. Tests of the ammonia explosion process resulted in less than 20% of the total fiber being solubilized along with there being a significant browning reaction and residual ammonia were found in the extracted hemicellulose. Additionally, the yield of hemicellulose from hot liquid or steam treatments to corn fiber is too low to be commercially viable.

In view of the foregoing, a need still exists for a process of extracting hemicellulose from corn fiber that has one or more of the following attributes: it can be readily implemented on a commercial scale, is relatively low-cost; can produce one or more relatively high value products such as gum replacers, low-sugar natural fibers, and/or low-sugar bulking agents.

SUMMARY OF THE INVENTION

The present invention is directed to a process of separating one or more components of corn fiber, the process comprising:
(a) contacting the corn fiber, which comprises a matrix that comprises hemicellulose, cellulose, and lignin, with an extraction fluid that comprises at least one weak acid to form an extraction mixture;
(b) solubilizing hemicellulose of the corn fiber by controlling the temperature of the extraction mixture so that the extraction fluid is sufficiently acidic to break linkages between hemicellulose and lignin via hydrolysis, $T_{SOL}$, thereby dissolving the solubilized hemicellulose into the extraction fluid;
(c) quenching hydrolysis by controlling the temperature of the extraction mixture so that the extraction fluid is not sufficiently acidic to substantially depolymerize the dissolved hemicellulose, $T_{QUENCH}$; and
(d) separating the extraction mixture into a soluble fraction comprising dissolved hemicellulose and an insoluble fraction comprising cellulose.

The present invention is also directed to a process of separating one or more components of de-starched corn fiber, the process comprising controlling the temperature of an extraction mixture, which comprises de-starched corn fiber and an extraction fluid that comprises at least one weak carboxylic acid, to solubilize and dissolve hemicellulose from the de-starched corn fiber into the extraction fluid so that the amount of dissolved hemicellulose is in the range of about 30 to about 75% by weight of the de-starched corn fiber and at least 40% by weight of the dissolved hemicellulose has a degree of polymerization of at least 3.

Additionally, the present invention is directed to a process of separating one or more components of de-starched corn fiber, the process comprising solubilizing and dissolving hemicellulose from the de-starched corn fiber into an extraction fluid of an extraction mixture, which comprises about 6.5 parts by weight of de-starched corn fiber and about 100 parts by weight of the extraction fluid, wherein the extraction fluid comprises citric acid at a concentration in the range of about 0.01 M to about 0.05 M by controlling the temperature of the extraction mixture so that it is in the range of about 120° C. to about 150° C. for a duration in the range of about 2 minutes to about 10 minutes and then quenching it to a temperature below said range so that (a) the amount of dissolved hemicellulose is in the range of about 50 to about 60% by weight of the de-starched corn fiber, (b) the dissolved hemicellulose comprises (i) monosaccharides and disaccharides at a total amount that is in the range of about 30 to about 40% by weight of the dissolved hemicellulose, (ii) oligosaccharides at a total amount that is less than about 5% by weight of the dissolved hemicellulose, and (iii) polysaccharides at a total amount that is in the range of about 55 to about 70% by weight of the dissolved hemicellulose.

DETAILED DESCRIPTION OF THE INVENTION

Figure 1:
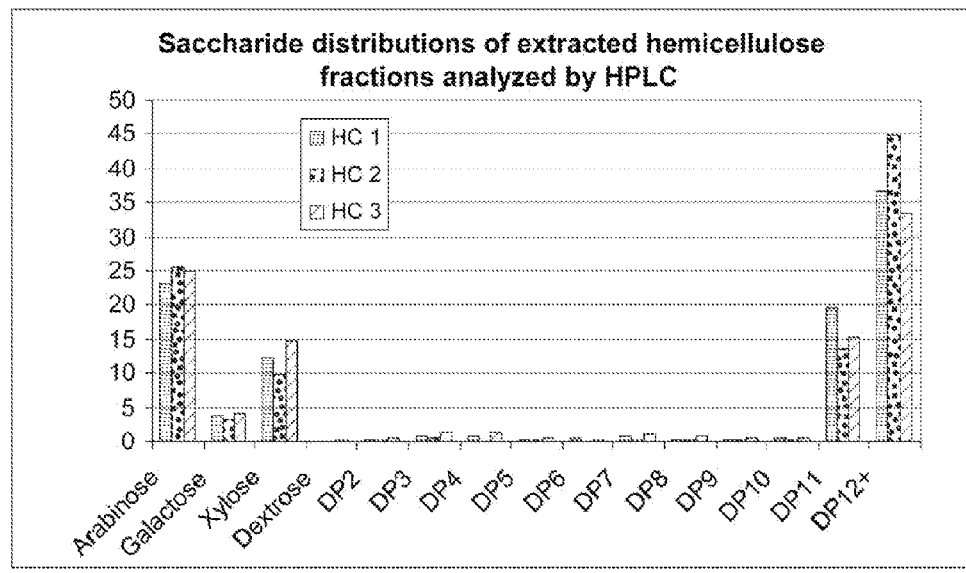
FIG. 1 is a chart comparing the saccharide distributions of soluble fractions extracted from de-starched corn fiber according to different embodiments of a process of the present invention.

The present invention is directed, at least in part, to a process of separating one or more components of corn fiber, which comprises a matrix that comprises hemicellulose, cellulose, and lignin. Although not required, in one embodiment of the present invention, the corn fiber source material is de-starched corn fiber. Advantageously, using de-starched corn fiber typically results in the product of the process to have a higher percentage fiber, which tends to make the end product more desirable as a food ingredient. That said, if one is not concerned about a product produced by the process of the present invention comprising a significant amount of starch or hydrolyzed starch (e.g., use of the product in a fermentation process for the production of ethanol), then using non-de-starched corn fiber may be desirable. Further, the de-starched corn fiber used in the process of the present invention may be de-starched according to any applicable process of de-starching such as with enzymes, water washing, and combinations thereof. In view of the foregoing, it should be understood that corn fiber, de-starched corn fiber, and any degree of partially de-starched corn fiber may be used in the process of the present invention.

More particularly, the process of the present invention comprises contacting corn fiber with an extraction fluid that comprises at least one weak acid to from an extraction mixture. The process further comprises solubilizing hemicellulose of the corn fiber by controlling the temperature of the extraction mixture so that the extraction fluid is sufficiently acidic to break linkages between hemicellulose and lignin via hydrolysis, $T_{SOL}$, thereby dissolving the solubilized hemicellulose into the extraction fluid. The process further comprises quenching the aforementioned hydrolysis by controlling the temperature of the extraction mixture so that the extraction fluid is not sufficiently acidic to substantially depolymerize the dissolved hemicellulose, $T_{QUENCH}$. Still further, the process comprises separating the extraction mixture into a soluble fraction comprising dissolved hemicellulose and an insoluble fraction comprising cellulose. Thus, by performing this process, at least hemicellulose is separated from the corn fiber. If further processing is desired, the process may also comprise treating the aforementioned soluble fraction to separate the dissolved hemicellulose from extraction fluid.

Weak Acids

As set forth above, the process of the present invention involves using a weak acid. In general, unlike strong acids, (e.g., HCl and $H_2SO_4$), when weak acids (e.g., citric acid and acetic acid) are dissolved in water, the reaction of forming hydronium ions ($H_3O^+$) does not proceed to completion. For example, in a 0.1 M solution of acetic acid at 25° C. only about 1% of the acetic acid molecules ionize by transferring their protons to water. It should be noted that all references to $pK_a$ set forth herein are the values at 25° C. unless noted otherwise. It is known that equilibrium constants, including $pK_a$, vary with temperature according to the van't Hoff equation.

The degree of acidity is usually expressed as $pK_a$, which is the negative logarithm of the acidity constant $K_a$. This practice is analogous to expressing the hydronium ion concentration as pH. There is an inverse relationship between the magnitude of the $pK_a$ and the strength of the acid—the larger the value of the $pK_a$, the weaker the acid. This includes negative numbers; HCl is considered a very strong acid having a $pK_a$ of −7 whereas nitric acid is considered a weak acid having a $pK_a$ of −1.4. Typically, an acid having a $pK_a$ that is at greater than −2 is considered a weak acid. Acids with a $pK_a$ value of −2 or less are more than 99% dissociated at pH 0 (1 M acid). Weak acids include monoprotic acids (acids that lose one proton) such as acetic acid and polyprotic acids (acids that can lose more than one proton) such a phosphoric acid ($H_3PO_4$), which can lose three protons that correspond to three $pK_a$ values ($pK_{a1}$=2.15, $pK_{a2}$=7.2, and $pK_{a3}$=12.37).

In certain embodiments of the present invention, each of the weak acids present in the extraction fluid have a $pK_a$ that is greater than −2, at least 0, at least 2, or at least 4.

In certain other embodiments of the present invention, the extraction solution does not comprise any strong acids. Thus, the only acids present in the extraction fluid are weak acids. In such embodiments, each of the weak acids present in the extraction fluid has a $pK_a$ that is greater than −2, at least 0, at least 2, or at least 4.

Although inorganic weak acids such as phosphoric acid and nitric acid may be included in the extraction fluid (and, in fact, may be the only weak acids in the extraction), in another embodiment of the present invention the extraction fluid comprises at least one carboxylic acid. In another embodiment, the at least one weak acid of the extraction fluid consists of at least one carboxylic acid. Examples of carboxylic acids that are weak acids include citric acid, lactic acid, malic acid, acetic acid, fumaric acid, formic acid, oxalic acid. In one embodiment, the at least one carboxylic acid included in the extraction fluid is selected from the group consisting of citric acid, lactic acid, malic acid, acetic acid, fumaric acid, formic acid, oxalic acid, and combinations thereof. In another embodiment, the at least one carboxylic acid that is selected from the group consisting of citric acid, malic acid, and fumaric acid, and combinations thereof. In other embodiment the at least one carboxylic acid is citric acid.

Typically, the amount of weak acid(s) in the extraction fluid is such that the total concentration of weak acid(s) is in the range of about 0.001 M to about 10 M. That said, experimental results to date indicate that the process of the present invention may be performed with a desirable balance between raw material costs, safety, time, efficiency, when the total concentration of weak acid(s) is in the range of about 0.01 M to about 1 M.

Regarding the water in the extraction fluid, any suitable variety may be utilized in accordance with the present invention. That said, in the event the extracted hemicellulose and AXOS are to be used as food ingredients, deionized or distilled water is typically preferred.

Relative Amounts of Extraction Fluid and Corn Fiber in the Extraction Mixture

Practicalities lead one to form an extraction mixture that comprises at least enough extraction fluid wet and suspend and/or dissolve the amount of corn fiber that is to be treated. That said, it is not believed that the ratio of extraction fluid to corn fiber is overly critical. In fact, it is believed that the process of the present invention may be performed with an extraction mixture for which the ratio of extraction fluid to corn fiber may be within a relative wide range. For example, in one embodiment of the present invention, the process is controlled so that the extraction mixture has a weight ratio of corn fiber to extraction fluid that is in the range of about 1:100 to about 60:100. In another embodiment, the extraction mixture has a weight ratio of corn fiber to extraction fluid that is in the range of about 3:100 to about 20:100.

Solubilizing Hemicellulose

As mentioned above, the process of the present invention comprises solubilizing hemicellulose of the corn fiber by controlling the temperature of the extraction mixture so that the extraction fluid is sufficiently acidic to break linkages between hemicellulose and lignin via hydrolysis, $T_{SOL}$, thereby dissolving the solubilized hemicellulose into the extraction fluid. The process of the present invention also comprises quenching the hydrolysis by controlling the temperature of the extraction mixture so that the extraction fluid is not sufficiently acidic to substantially depolymerize the dissolved hemicellulose, $T_{QUENCH}$.

Weak acids in the extraction mixture, when at relatively low temperatures (e.g., less than about 50° C.), tend not to attack or react with the components of the corn fiber. For example, at relatively low temperatures the weak acids in the extraction mixture are not sufficiently acidic to break many linkages between hemicellulose and lignin via hydrolysis. In contrast, strong acids in a solution at relatively low temperatures would be sufficiently acidic to break linkages between hemicellulose and lignin (the extent of the reaction with respect to the amount of corn fiber would, of course, depend in large part on the concentration of the acids and the pH of the solution). Thus, the process of the present invention allows for the hydrolysis of chemical bonds in the corn fiber to be controlled in a relatively simple, reliable, and safe manner without the need to add chemicals to neutralize the acidity of the extraction mixture. For the linkages between the hemicellulose and lignin to be broken at a significant rate, the temperature of the extraction mixture is simply elevated to a point in which the weak acid(s) present in the extraction mixture are sufficiently acidic to break linkages between hemicellulose and lignin via hydrolysis, $T_{SOL}$.

Conversely, after the desired amount of hydrolysis has occurred, the hydrolysis reaction in the present process can be effectively quenched or stopped by controlling (lowering) the temperature of the extraction mixture to a point at which the extraction fluid is not sufficiently acidic to significantly hydrolyze chemical bonds of the dissolved hemicellulose, $T_{QUENCH}$. Stated another way, the value of $T_{QUENCH}$ is such that the acidity of the extraction fluid is low enough that hydrolysis of the separated hemicellulose for all intents and purposes is effectively halted. This is particularly advantageous over previously known processes utilizing hydrochloric acid or sulfuric acid because those acids continue to hydrolyze glycosidic bonds of dissolved hemicellulose until they are chemically neutralized. As a result, when using such strong acids significant portions of hemicellulose separated from the corn fiber tended to be broken down to sugars (DP1-2). Thus, because the hydrolysis may be essentially stopped by simply decreasing the temperature of the extraction mixture, the process of the present invention may be controlled so that a greater portion of the hemicellulose separated from the corn fiber is DP3+ while still allowing for relatively high overall yield of separated hemicellulose.

Of course, the minimum $T_{SOL}$ and maximum $T_{QUENCH}$ for any particular extraction mixture will depend, at least in part, on the particular weak acids that are in extraction fluid. Nonetheless, determining an appropriate $T_{SOL}$ and $T_{QUENCH}$ for a particular extraction mixture is straightforward for a person of ordinary skill in the art. In one embodiment of the present invention, $T_{SOL}$ is in the range of about 50° C. to about 350° C. In another embodiment, $T_{SOL}$ is in the range of about 120° C. to about 150° C. In one embodiment of the present invention, $T_{QUENCH}$ is in the range of about 5° C. to about 40° C. In another embodiment, $T_{QUENCH}$ is in the range of about 10° C. to about 30° C.

Similarly, the duration that the extraction mixture is at $T_{SOL}$, (i.e., at a temperature in the $T_{SOL}$) $t_{SOL}$, will depend upon how much of the hemicellulose in the corn fiber that is desired to be dissolved in the extraction fluid, which in turn depends, at least in part, on the precise temperature(s) selected within the $T_{SOL}$ range. In general, the greater the temperature the faster bonds are broken via hydrolysis in between constituents of the corn fiber and once said constituents are separated (e.g., dissolved hemicellulose). In general, the longer the duration of $t_{SOL}$ the more hemicellulose in the corn fiber is dissolved in the extraction fluid. Thereby increasing overall yield of separated hemicellulose. But the longer the duration, the greater the amount of dissolved hemicellulose is depolymerized to sugars (DP1-2). Thus, a practitioner of the process of the present invention will select values for the aforementioned variables, including $t_{SOL}$, that result in the desired outcome. Determinations for such values may be based upon the information disclosed herein, through routine testing, or both, and is straightforward to one of ordinary skill in the art. In one embodiment of the present invention, the extraction mixture is at $T_{SOL}$ for a duration, $t_{SOL}$, that is in the range of about 1 minute to about 200 minutes. In another embodiment, the extraction mixture is at $T_{SOL}$ for a duration, $t_{SOL}$, that is in the range of about 2 minutes to about 10 minutes.

Although not required, after the desired amount of separation of hemicellulose from lignin and cellulose has occurred, it is often desirable to quench the hydrolysis reaction by lowering the temperature of the extraction fluid relatively quickly in order to minimize the depolymerization of the hemicellulose that is separated from the corn fiber and dissolved in the extraction fluid. The relatively quick decrease in temperature along with the heating of the extraction fluid may be accomplished by any appropriate manner such as using a jacket to add or remove heat by flowing hot water, steam, tap water, or chilled water therethrough. In one embodiment of the present invention, the average rate of change from $T_{SOL}$ to $T_{QUENCH}$ during the quenching is in the range of about 0.1° C./s to about 5° C./s. In another embodiment, the average rate of change from $T_{SOL}$ to $T_{QUENCH}$ during the quenching is in the range of about 0.5° C./s to about 1° C./s.

It is to be noted that the process of the present invention may be conducted in a continuous manner. For example, the extraction mixture may be heated to $T_{SOL}$ by directing the mixture through a zone at a temperature of at least about $T_{SOL}$ so that the residence time of any portion of said mixture at $T_{SOL}$ is $t_{SOL}$. The hydrolysis reaction is quenched by directing the mixture through a zone at a temperature that is no greater than $T_{QUENCH}$. A specific example of a similar continuous apparatus/operation is described in U.S. Pat. No. 4,256,509, which is incorporated by reference herein in its entirety.

Separating the Extraction Mixture into Fractions

As mentioned above, the process of the present invention also comprises separating the extraction mixture into a soluble fraction comprising dissolved hemicellulose and an insoluble fraction comprising cellulose and lignin. This may be accomplished by any appropriate manner such as filtration or centrifugation.

Although not required, if desired, the separated insoluble fraction comprising cellulose and lignin may be dried by any appropriate manner such as oven drying or drying with blown air, which may be heated. Additionally, if desired, the separated soluble fraction may also be treated to evaporate the solvent (e.g., water) to yield a dried soluble fraction that comprises solid hemicellulose that was previously dissolved. The evaporation of the solvent may be accomplished by any appropriate manner such as spray drying, freeze drying, or oven drying.

Product of the Process

As mentioned above, the process of the present invention may be performed to control the amount of soluble material, including hemicellulose and AXOS, that is extracted or separated from corn fiber. Further, as mentioned above, in certain embodiments of the present invention the process is performed on de-starched corn fiber. By way of example, in such embodiments, the process may be performed so that the dissolved hemicellulose of the soluble fraction is at an amount that is in the range of about 30 to about 75% by weight of the de-starched corn fiber and the cellulose of the insoluble fraction is at an amount that is in the range of about 15 to about 30% by weight of the de-starched corn fiber. In other such embodiments, the dissolved hemicellulose of the soluble fraction is at an amount that is in the range of about 50 to about 60% by weight of the de-starched corn fiber and the cellulose of the insoluble fraction is at an amount that is in the range of about 20 to about 30% by weight of the de-starched corn fiber.

It is also mentioned that the process of the present invention may be performed so as to control the degree of polymerization of such separated hemicellulose. By way of example, the process may be performed in certain embodiments so that the dissolved hemicellulose of the soluble fraction comprises (i) monosaccharides and disaccharides at a total amount that is in the range of about 20 to about 75% by weight of the dissolved hemicellulose, (ii) oligosaccharides at a total amount that is less than about 10% by weight of the dissolved hemicellulose, and (iii) polysaccharides at a total amount that is in the range of about 25 to about 70% by weight of the dissolved hemicellulose. In other embodiments, the dissolved hemicellulose of the soluble fraction comprises (i) monosaccharides and disaccharides at a total amount that is in the range of about 30 to about 40% by weight of the dissolved hemicellulose, (ii) oligosaccharides at a total amount that is less than about 5% by weight of the dissolved hemicellulose, and (iii) polysaccharides at a total amount that is in the range of about 55 to about 70% by weight of the dissolved hemicellulose.

In another embodiment, the process comprises controlling the temperature of an extraction mixture, which comprises de-starched corn fiber and an extraction fluid that comprises at least one weak carboxylic acid, to solubilize and dissolve hemicellulose from the de-starched corn fiber into the extraction fluid so that the amount of dissolved hemicellulose is in the range of about 30 to about 75% by weight of the de-starched corn fiber and at least 40% by weight of the dissolved hemicellulose has a degree of polymerization of at least 3. In yet another embodiment, it may be preferable for at least 30% by weight of the dissolved hemicellulose to have a degree of polymerization of at least 11. It may also be preferable for no more than 10% by weight of the dissolved hemicellulose to have a degree of polymerization in the range of 3 to 10. Still further, it may be preferable for no more than 60% by weight of the dissolved hemicellulose to have a degree of polymerization in the range of 1-2.

In yet another embodiment the process for separating one or more components of de-starched corn fiber may be performed by solubilizing and dissolving hemicellulose from the de-starched corn fiber into an extraction fluid of an extraction mixture, which comprises about 6.5 parts by weight of de-starched corn fiber and about 100 parts by weight of the extraction fluid, wherein the extraction fluid comprises citric acid at a concentration in the range of about 0.01 M to about 0.05 M by controlling the temperature of the extraction mixture so that it is in the range of about 120° C. to about 150° C. for a duration in the range of about 2 minutes to about 10 minutes and then quenching it to a temperature below said range so that (a) the amount of dissolved hemicellulose is in the range of about 50 to about 60% by weight of the de-starched corn fiber, (b) the dissolved hemicellulose comprises (i) monosaccharides and disaccharides at a total amount that is in the range of about 30 to about 40% by weight of the dissolved hemicellulose, (ii) oligosaccharides at a total amount that is less than about 5% by weight of the dissolved hemicellulose, and (iii) polysaccharides at a total amount that is in the range of about 55 to about 70% by weight of the dissolved hemicellulose.

EXAMPLES

The following disclosed embodiments are merely representative of the invention which may be embodied in various forms. Thus, specific structural, functional, and procedural details disclosed in the following examples are not to be interpreted as limiting.

Process of De-Starching of Corn Fiber

About 750 grams of Vetter's corn fiber with 40% dry solids (d.s.) was mixed with purified water to a total weight of 4 kg in a steel container. The fiber suspension was heated to boiling temperature (about 95° C.) on a hot plate with a Maxima digital stirrer (Fisher Scientific, Pittsburgh, Pa.) equipped with a 2-blade (45 mm diameter) stirring shaft. The pH of the suspension was adjusted to about 6.5 using a 1 N NaOH solution. About 6 mL of a 1 M $CaCl_2$ solution was also added. Then about 6 mL of Termamyl SC DS (Novozymes North America, Inc., Franklinton, N.C.) was added to the fiber suspension and the enzymatic reaction was carried out at about 95° C. for about 1.5 hours. The fiber suspension was sealed in the steel container using aluminum foil and kept at room temperature overnight. Then, the fiber suspension was heated to about 57° C. and the pH was adjusted to about 4.5 using a 30 wt % citric acid solution. About 6 mL Spirizyme Fuel (amyloglucosidase, Novozymes North America, Inc., Franklinton, N.C.) was added to the suspension and allowed to react at about 57° C. for about 3 hours. Then, the temperature of the suspension was decreased to about 50° C. (the pH was about 4.5) and about 6 mL ProSteep™ (protease, Genencor International, Inc., Rochester, N.Y.) was added and allowed to hydrolyze protein for about 1.5 hours. Then, the temperature was increased to about 85° C. and maintained for about 5 minutes to inactivate the protease and amyloglucosidase. The de-starched fiber was filtered on a Buchner funnel with a No. 2 filter cloth (Filtration Services, 2171 E. Andrews St., Macon Ill. 62544) under vacuum and the resulting wet fiber cake was dried at about 50° C. in a forced air oven.

Extraction of Hemicellulose Using Citric Acid

About 90 grams of de-starched corn fiber (DS) was combined with purified water such that the combined weight was about 1450 grams. About 20 grams of a 30 wt % citric acid solution was added thereto along with an additional volume of purified water such that the that the total weight was about 1500 grams and the pH was about 2.8. The fiber suspension was transferred into a 2-liter high pressure stainless steel reactor equipped with agitation and controlled steam heating through its jacket. The suspension was heated to about 150° C. and held at that temperature for about 2 minutes or about 10 minutes to solubilize the hemicellulose. The suspension was then cooled rapidly using tap water in the jacket. After the reaction, the pH was about 2.8. The solution was filtered using a tight No. 2 filtration cloth on a Buchner funnel and the resulting fiber cake was washed with purified water and was dried at about 50° C. in a forced air oven for about 24 hours. The weight of filtrate and washing water was recorded and the moisture was measured using a forced air oven moisture process (about 105° C. for about 1.5 hours). The weight and moisture of the dried fiber was recorded for calculation of mass balance.

High Performance Liquid Chromatography (HPLC)

The product of the above-described extraction process was subjected to HPLC utilizing an Aminex® resin-based column in the silver form to separate sugars of different degrees of polymerization (DP) (saccharide distribution of DP1-10). Aminex® resin-based columns for carbohydrate separation use a combination of size exclusion and ligand exchange mechanisms. More specifically, for oligosaccharide separations, size exclusion is the primary mechanism of separation (low crosslinked resins allow carbohydrates to penetrate and oligosaccharides separate by size). For monosaccharide separations, ligand exchange is the primary mechanism, which involves the binding of hydroxyl groups of the sugars with the fixed-counterion of the resin. Ligand exchange is affected by the nature of the counterion (Ag+, Ca++, etc.) and by the spatial orientation of the carbohydrate's hydroxyl groups.

The samples were run using a HPLC system available from Waters Corporation (HPX-42A) in which the column had a length of 30 cm and an inner diameter of 7.8 mm. The system was operated under the following conditions: the column temperature was about 85° C.; the solvent was deionized degassed water; the flow rate was about 0.6 mL/minute; the detector sensitivity was set at 16×; the injection volume was about 20 µl; and the run time was about 25 minutes. The samples had approximately 1% dry solids. A standard containing known straight chain carbohydrates from dextrose to maltohexose (DP6) was prepared and analyzed to compare to retention times of possible substituted carbohydrates.

Gel Permeation Chromatography (GPC)

The product of the above-described extraction process was subjected to GPC, which separates molecules based on their size or hydrodynamic volume in solution. Samples were diluted in water and the molecules were separated using four columns of varying pore sizes in series: a Ultrahydragel® 120 Å column from Waters Corporation; two 250 Å columns; and one 1000 Å column. The eluent was water with 0.1 N NaNO$_3$ added and the flow rate was about 0.6 ml/minute. After separation, the molecules were detected with a differential refractive index detector that feeds the raw data to a multichannel chromatographic software package. The molecular weight distributions were calculated based on comparison to a series of polysaccharide molecular weight standards using a narrow polydispersity calibration technique.

High-Performance Anion-Exchange Chromatography with Pulsed Amperometric Detection (PHPAE-PAD)

The product of the above-described extraction process was subjected to PHPAE-PAD. The carbohydrates were converted into their anionic form and separated on a strong basic anion exchanger in the hydroxide form. The carbohydrate anions were detected by pulsed amperometric detection at a gold working electrode. The separation was achieved with a Dionex Carbopac PA1 column set with gradient elution of acetate in sodium hydroxide. The initial run conditions were 100 mM sodium hydroxide for 4 minutes at 1.2 mL/min. Over the next 20 minutes, sodium acetate was added from 0 to 375 mM concentration and held at the upper concentration for 10 minutes, 100 mM NaOH/375 mM NaOAc. Samples and standards were all diluted in water.

Dextrose Determination

Samples of the product of the above-described extraction process were diluted to contain less than 0.2% dextrose. The dextrose was analyzed using an YSI Model 27 Analyzer (Yellow Springs Instrument Co., Yellow Springs, Ohio).

Analysis of Starch Content

The product of the above-described extraction process was analyzed for starch content. Starch in the sample was gelatinized and then hydrolyzed using amylase and amyloglucosidase to β-D-glucose. The glucose was then analyzed by YSI Model 27 Dextrose Analyzer.

Samples were ground by a coffee grinder and then about 0.2 to 0.4 grams of sample was added to a 50 mL flask along with about 20 ml of deionized water was added. The flask was covered with aluminum foil and autoclaved at about 121° C. and 20 psi for about 20 minutes to gelatinize starch. Then about 5.0 ml acetate buffer (33.0 grams anhydrous sodium acetate and 24.0 ml glacial acetic acid in 200 ml) and about 0.4 ml calcium chloride (6.25%) was added into each flask. The flasks were covered and incubated at about 60° C. for about 45 minutes while being shook at a rate of 200 rpm. After enzymatic hydrolysis, the samples were analyzed for dextrose using a YSI Dextrose analyzer. The conversion factor of 0.9 was used for conversion of dextrose to starch (starch weight=0.9×dextrose weight).

Analysis of Protein Content

The Kieldahl nitrogen process was used for determination of protein (Bradstreet, 1954).

Analysis of Ash Content

About 2-10 grams of sample (depending on the moisture content and type of samples) was added to a crucible. The sample was heated over a Bunsen burner to char the samples until the sample no longer sustained either flame or smoke. The sample was placed in a muffle furnace at about 538° C. and heated for at least 5 hours or overnight (16 hours). The ratio of residue weight to the sample weight, expressed as a percentage, was determined to be the content of ash (wt %).

Analysis of Fat Content

About 2.5-5.0 grams sample was added into a 400 ml glass beaker along with about 150 ml of 3 N HCl. The beaker was covered, placed in an autoclave and heated for about 15 minutes at about 121° C. and 20 psi to free fatty components from starch and protein complexes. The freed fatty components were separated by filtration and extracted from the filter paper using petroleum ether. The fat residue was gravimetrically determined after evaporation of the solvent. The ratio of fat residue to the sample weight, expressed as a percentage, was determined to be a measure of the total fat in the sample.

Analysis of Moisture or Dry Solids (d.s.)

Moisture of insoluble cellulosic material was determined using Computrac Moisture Analyzer (Model MAX 1000, Arizona Instrument LLC, Chandler, Ariz.). Dry solid (d.s.) of soluble fraction was determined using a forced air oven process that involved drying about 12 grams of solution in a 76 mm diameter aluminum pan at about 105° C. for about 1.5 hours. The d.s. of the dried soluble fraction was determined using a vacuum drying oven at about 70° C. for about 5 hours. The ratio of dried material weight to the sample weight, expressed as a percentage, was determined to be the content of dry solids (wt %).

Sulfuric Acid Hydrolysis

About 0.15 N sulfuric acid was used to hydrolyze soluble and insoluble materials in a boiling water bath for about 4 hours. About 0.6 ml of 1 N sulfuric acid was added in 4 ml of total solution. The soluble material d.s. was about 1.73 wt % and the insoluble material d.s. was about 4.82 wt %.

Enzyme Hydrolysis

About 5 ml of 2.03 wt % soluble fraction was hydrolyzed by 10 µl of enzymes overnight (about 16 hours) and the enzymes were inactivated by heating the solution by contacting its container with a boiling water bath for about 10 minutes.

Results and Discussion

The yield of de-starched fiber from Vetter's corn fiber was about 65 wt % as set forth in Table 1.

TABLE 1

De-starch of corn fiber

| Starting materials | Final materials | wt. (g) | d.s.* (wt %) | Dry solids (g) |
|---|---|---|---|---|
| Corn fiber | | 750 | 40.0% | 300.0 |
| Fiber slurry | | 4000 | 7.5% | 300.0 |
| | Filtrate + Washes | 4567 | 2.2% | 101.4 |
| | De-starched fiber cake | 205 | 95.3% | 195.4 |
| | Total d.s. from filtrate and cake | | | 296.8 |
| | Yield of de-starched fiber | | | 65.1% |

*Dry substance

The compositions of the corn fiber before and after de-starching process are shown in Table 2.

TABLE 2

| | d.s. (wt %) | dextrose (wt %) | protein (wt %) | starch (wt %) | fat (wt %) | ash (wt %) |
|---|---|---|---|---|---|---|
| Dried Vetter's corn fiber | 94.34 | 0.52 | 10.5 | 20.87 | 2.71 | 0.8 |
| de-starched corn fiber | 95.3 | 0.2 | 9.4 | 0.1 | 4.68 | 0.62 |

The yields of extracted hemicellulose (AXOS) ranged from about 33 wt % to about 65 wt % as set forth in Table 3.

TABLE 3

| Sample ID | Starting Material | Extraction Conditions | Hemicellulose fraction yield (wt %) |
|---|---|---|---|
| HC 1 | De-starched corn fiber (6 wt%) | 0.4% citric acid, 150° C., 10 min | 58.4 |
| HC 2 | De-starched corn fiber (6 wt%) | 0.4% citric acid, 150° C., 2 min | 32.9 |
| HC 3 | De-starched corn fiber (6 wt%) | 0.4% citric acid, 160° C., 2 min | 64.7 |

Figure 2:
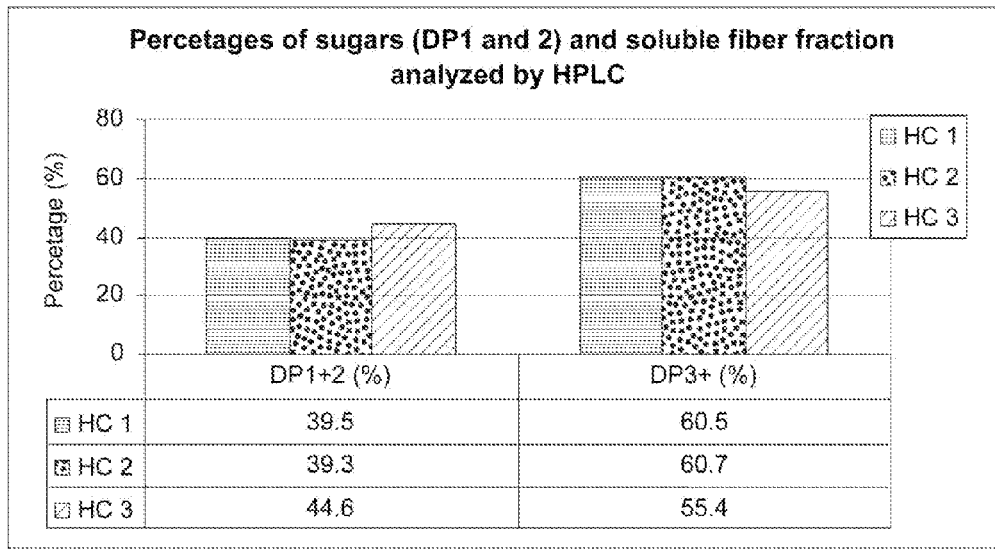
FIG. 2 is a chart comparing the percentages of sugars (DP1-2) and soluble fiber (DP 3 and higher or DP3+) in soluble fractions extracted from de-starched corn fiber according to different embodiments of a process of the present invention.

The saccharide distributions of soluble fraction are shown in FIGS. 1 and 2. The compositions of saccharides have bimodal distributions: monomers (arabinose, xylose and galactose) and compounds with higher degrees of polymerization (DP11, DP12, and higher). DP1 and DP2 saccharides are considered to be sugars whereas DP3+ saccharides are potentially water soluble fiber because they are not broken down by the human digestive enzymes. FIG. 2 shows that soluble fractions contain sugars (DP1 and DP2) at a concentration within a range of about 39 wt % to about 45 wt % and DP3+ at a concentration within a range of about 55 wt % to about 61 wt %.

As can be seen from the results, it is possible to select various parameters of the process of the present invention to control the yield and saccharide distribution of the soluble fraction. In general, these results indicate that increasing the solubilization temperature, $T_{SOL}$, and/or the duration the extraction mixture is at the solubilization temperature, $t_{SOL}$, tends to increase the yield of the soluble fraction but it also tends to decrease the amount of DP3+ saccharides in said soluble fraction. That said, the foregoing results indicate that the solubilization temperature tends to play a greater role in yield and saccharide distribution than duration the extraction mixture is at the solubilization temperature.

Figure 3:
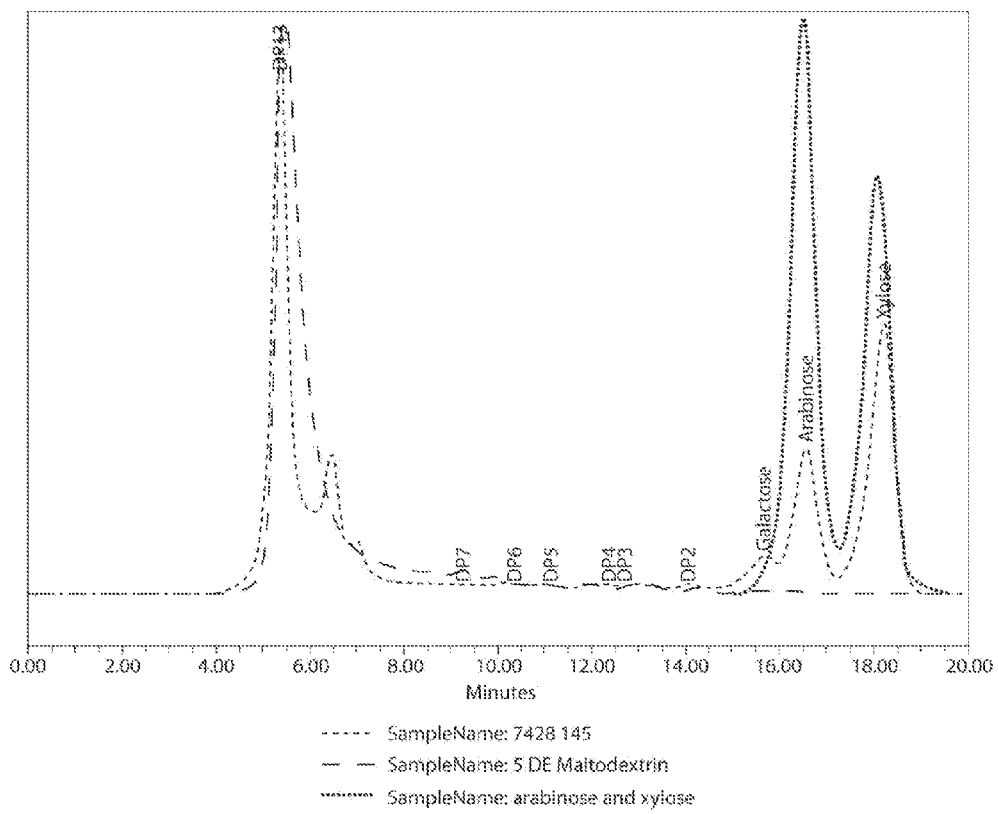
FIG. 3 is a chart comparing the saccharide distribution of an extracted soluble fraction (HC 1, labeled as 7428-145) to 5 DE maltodextrin, galactose, arabinose, and xylose.

Referring to FIG. 3, the saccharide distribution of extracted hemicellulose/AXOS was compared to chromatographic profiles of arabinose, xylose, galactose, and maltodextrin of dextrose equivalence (DE) of 5. Among other things, the comparison shows that most of the non-sugar fractions are similar to maltodextrin DE 5 in molecular weights.

Figure 4:
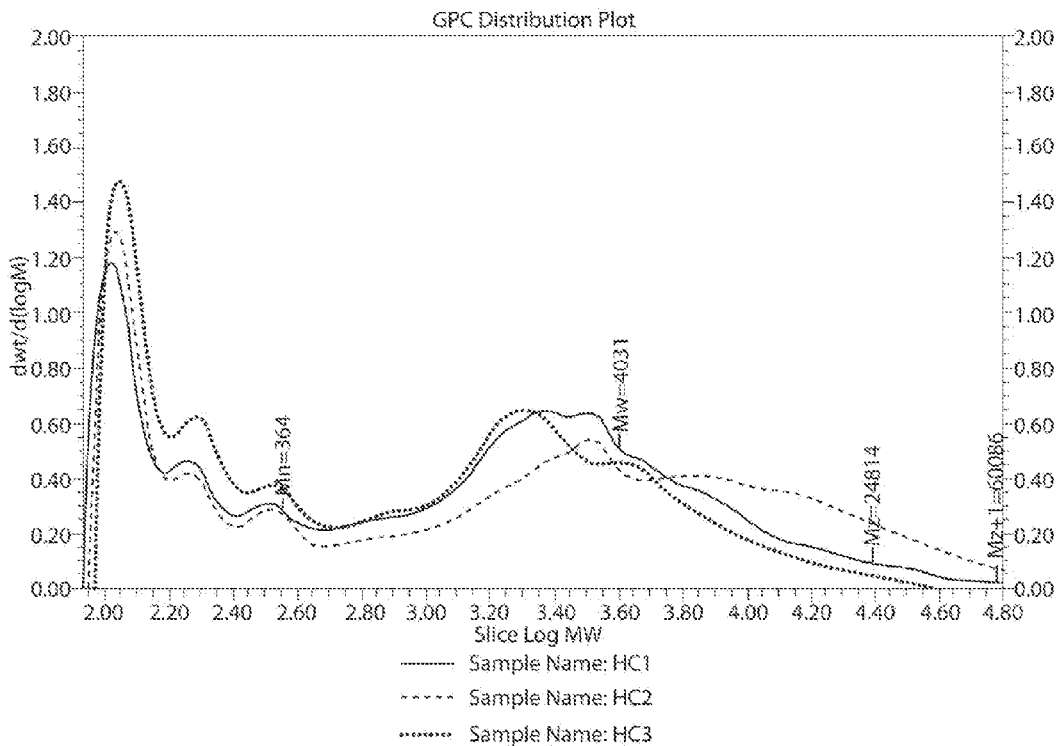
FIG. 4 shows gel permeation chromatography (GPC) profiles of molecular weight distributions of different hemicellulose/AXOS samples extracted according to different embodiments of a process of the present invention.

Referring to FIG. 4, the GPC molecular weight distributions of extracted hemicelluloses/AXOS show that the extraction at 150° C. for 2 minutes produced more high molecular weight fraction than extraction at 150° C. for 10 minutes. The extraction at 160° C. for 2 minutes resulted in more sugars and less high molecular fraction than the extraction at 150° C. for 2 minutes.

Compositions of de-starched corn fiber, soluble, and insoluble fractions after extraction at 150° C. for 10 minutes were analyzed to check the purities of soluble fraction. The results are set forth in Table 4.

TABLE 4

Contents of ash, dextrose, moisture, protein, fat and starch in de-starched corn fiber and soluble and insoluble fractions after extraction at 150° C. for 10 min

| Description | Ash %__as is | Dextrose %__as is | Moisture %__as is | Protein %__as is | Fat %__as is | Starch %__as is |
|---|---|---|---|---|---|---|
| De-starched corn fiber | 1.047 | 0.07 | 3.7 | 8.47 | 5.14 | 0.12 |
| Soluble-Corn fiber extraction | 1.47 | 0.22 | 11.83 | 4.85 | 0.36 | 0.83 |
| Insoluble-Corn fiber extraction | <0.05 | 0.02 | 3.6 | 10.85 | 9.92 | 0.21 |

It is to be noted that little dextrose and starch were found in de-starched corn fiber, soluble, and insoluble fractions due to the successful de-starching process. Almost all the fat and a majority of the protein were in the insoluble fraction after extraction.

Table 5 compares the yields of extracted soluble fraction with and without subtraction of dextrose, protein, fat and starch from de-starched fiber and hemicellulose.

TABLE 5

Yields of hemicellulose from de-starched corn fiber with/without subtraction of detrose, protein, fat and starch after extraction at 150° C. for 10 min

| Starting materials | Final materials | wt. (g) | dry solids (%) | dry solids (g) |
|---|---|---|---|---|
| De-starched fiber | | 93.46 | 96.3% | 90.0 |
| De-starched fiber minus D, P, F and S* | | | | 77.1 |
| Citric acid | | 20 | 30.0% | 6.0 |
| Purified water | | 1404.0 | | |
| | Insoluble material | 44 | 96.4% | 42.4 |
| | Insoluble material minus D, P, F and S* | | | 33.2 |
| | Soluble | 2589 | 2.0% | 52.6 |
| | Dried soluble | 59.4 | 88.17% | 52.4 |
| | Dried soluble minus D, P, F and S* | | | 48.7 |
| | Yield of soluble material (containing hemicellulose) | | | 58.4% |
| | Yield of soluble material (containing hemicellulose) minus D, P, F and S* | | | 59.5% |

*D: dextrose, P: protein, F: fat, S: starch

The yield after subtraction of dextrose, protein, fat and starch increased to 59.5%. The insoluble cellulosic fraction has 68% total dietary fiber (AOAC process 991.43), 11% protein and 10% fat.

The purities of soluble hemicellulose and insoluble fractions were analyzed by mild acid hydrolysis at 100° C. followed by monomer analysis by HPAEC. The percentage of each monomer (arabinose, galactose, glucose, and xylose) of the total monomers is reported in Table 6.

TABLE 6

| Sample | Treatment | Arabinose (g) | Arabinose (wt %) | Galactose (g) | Galactose (wt %) | Glucose (g) | Glucose (wt %) | Xylose (g) | Xylose (wt %) |
|---|---|---|---|---|---|---|---|---|---|
| Extracted hemicellulose (150° C., 10 min) | Control | 1718 | 71.1 | 153 | 6.3 | 11 | 0.5 | 534 | 22.1 |
| Extracted hemicellulose (150° C., 10 min) | Sulfuric acid 0.15N, 100° C., 4 hrs | 4118 | 39.1 | 1025 | 9.7 | 267 | 2.5 | 5118 | 48.6 |
| Insoluble cellulosic fraction (150° C., 10 min) | Sulfuric acid 0.15N, 100° C., 4 hrs | 1313 | 15.6 | 941 | 11.2 | 174 | 2.1 | 6002 | 71.2 |

The glucose content of acid hydrolyzed hemicellulose is only 2.5%, which suggests no significant contamination of starch in the extracted hemicellulose. The extracted hemicellulose was hydrolyzed by four commercial enzymes and the highest glucose percentage over total monomers was 7% as set forth in Table 7, which may come from some hydrolyzed cellulose.

TABLE 7

| Sample | Treatment | Arabinose (µg/g) | Arabinose (wt %) | Galactose (µg/g) | Galactose (wt %) | Glucose (µg/g) | Glucose (wt %) | Xylose (µg/g) | Xylose (wt %) |
|---|---|---|---|---|---|---|---|---|---|
| Extracted hemicellulose (150° C., 10 min) | Control | 1718 | 71.1 | 153 | 6.3 | 11 | 0.5 | 534 | 22.1 |
| Extracted hemicellulose hydrolyzed by Accelerase ® XC | Xylanase/ cellulase/ minors* | 3625 | 56.4 | 625 | 9.7 | 349 | 5.4 | 1834 | 28.5 |

TABLE 7-continued

| Sample | Treatment | Arabinose (μg/g) | Arabinose (wt %) | Galactose (μg/g) | Galactose (wt %) | Glucose (μg/g) | Glucose (wt %) | Xylose (μg/g) | Xylose (wt %) |
|---|---|---|---|---|---|---|---|---|---|
| Extracted hemicellulose hydrolyzed by Accelerase ® XY | Xylanase/ minors | 3552 | 52.3 | 389 | 5.7 | 433 | 6.4 | 2421 | 35.6 |
| Extracted hemicellulose hydrolyzed by Accelerase ® 1500 | Cellulase/ β-glucosidase/ minors | 3502 | 58.2 | 348 | 5.8 | 421 | 7.0 | 1742 | 29.0 |
| Extracted hemicellulose hydrolyzed by Optimase ® CX 255L | Thermostable xylanase/ minors | 3434 | 60.2 | 325 | 5.7 | 329 | 5.8 | 1613 | 28.3 |

*Minors may include glucoamylase, α-amylase, and cellulase

Figure 5:
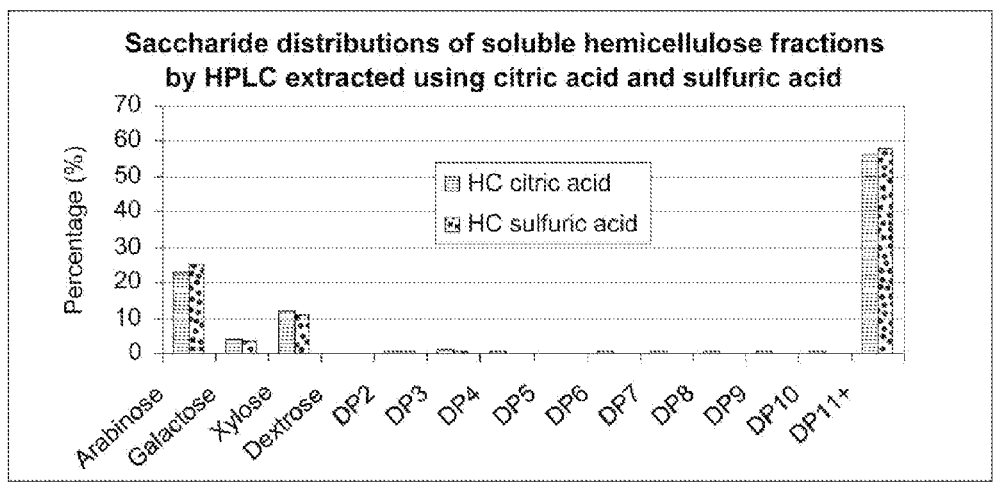
FIG. 5 is a chart showing the saccharide distribution of a soluble fraction that was extracted according to a process of the present invention using citric acid (a weak acid) with a yield of 58.4% compared to that extracted using sulfuric acid (a strong acid) with a yield of 39.3%.

Hemicellulose/AXOS was extracted using sulfuric acid at the same conditions as citric acid extraction (pH 2.8, 150° C. for 10 minutes). A 2 N sulfuric acid solution (7.8 grams total) was used to adjust the pH to 2.8. As set forth in Table 8, the yield of soluble hemicellulose using sulfuric acid extraction was 39.3%, which was significantly lower than that when citric acid was used. As shown in FIG. 5, the saccharide distributions of the soluble fractions extracted using citric acid or sulfuric acid are similar. Without being held to a particular theory, it is believed that the difference in yield is due, at least in part, to the fact that the $pK_a$ of citric acid decreases more at a high temperature than sulfuric acid, which produces a higher yield. Also, it is believed that because the $pK_a$ of citric acid significantly increases when the temperature decreases, the $pK_a$ is high enough so that hydrolysis substantially stops. In contrast, sulfuric acid continues to hydrolyze hemicellulose at relatively low temperature such as 35° C. to produce xylose, arabinose, and galactose together with di- and tri-saccharides.

TABLE 8

| Starting materials | Final materials | Weight (g) | d.s. (wt %) | d.s. (g) |
|---|---|---|---|---|
| De-starched fiber | | 94.44 | 95.3 | 90.0 |
| 2 N sulfuric acid | | 7.8 | | |
| Purified water | | 1397.8 | | |
| | Insoluble | 56 | 96.1 | 53.8 |
| | Soluble | 2622 | 1.35 | 35.4 |
| | Yield of soluble (containing hemicellulose) | | | 39.3 |

These examples of the process of the present invention used citric acid, a food grade weak organic acid, to extract hemicellulose so hydrolysis of hemicellulose after solubilization can be controlled. At a low temperature almost no hydrolysis occurs because of low acid strength. The $pK_a$ of weak acids and pH of water decrease as temperature increases so the acid strength increases. Solubilization only occurs substantially when temperature is increased. After the time of solubilization ends, the corn fiber solution was quenched to room temperature to stop the hydrolysis. The extracted hemicellulose comprised about 60 wt % of saccharides with a degree of polymerization of 3 and higher (DP3+), which may be used as a natural soluble fiber. The insoluble cellulosic material extracted from the corn fiber comprised about 68% total dietary fiber, which may be used as a natural insoluble fiber.

Having illustrated and described the principles of the present invention, it should be apparent to persons skilled in the art that the invention can be modified in arrangement and detail without departing from such principles.

Although the materials and processes of this invention have been described in terms of various embodiments and illustrative examples, it will be apparent to those of skill in the art that variations can be applied to the materials and processes described herein without departing from the concept, spirit and scope of the invention. All such similar substitutes and modifications apparent to those skilled in the art are deemed to be within the spirit, scope and concept of the invention as defined by the appended claims.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All ranges discussed can and do necessarily also describe all sub-ranges therein for all purposes and that all such sub-ranges are part of this invention. Any listed range can be easily recognized as sufficiently describing and enabling the same range being broken down into at least equal halves (e.g., a lower half and upper half), thirds, quarters, tenths, etc. Still further, for example, a range of from 5% to 20% should be interpreted to include numerical values such as, but not limited to 5%, 5.5%, 9.7%, 10.3%, 15%, etc., and sub-ranges such as, but not limited to 5% to 10%, 10% to 15%, 8.9% to 18.9%, etc., in addition to any other values, sub-ranges, etc., provided for illustrative purposes.

The invention claimed is:

1. A process of separating one or more components of destarched corn fiber, the process comprising:
   (a) contacting the destarched corn fiber, which comprises a matrix that comprises hemicellulose, cellulose and lignin, with an aqueous extraction fluid that comprises at least one weak acid at a total concentration of weak acid(s) in the range of about 0.01 M to about 1 M to form an extraction mixture;
   (b) solubilizing hemicellulose of the destarched corn fiber by controlling the temperature of the extraction mixture so that the extraction fluid is sufficiently acidic to break linkages between hemicellulose and lignin via hydrolysis, $T_{SOL}$, thereby dissolving the solubilized hemicellulose into the extraction fluid;

(c) quenching hydrolysis by controlling the temperature of the extraction mixture so that the extraction fluid is not sufficiently acidic to substantially depolymerize the dissolved hemicellulose, $T_{QUENCH}$; and (d) separating the extraction mixture into a soluble fraction comprising dissolved hemicellulose and an insoluble fraction comprising cellulose and lignin, wherein the dissolved hemicellulose of the soluble fraction is at an amount that is in the range of 30 to 75% by weight of the de-starched corn fiber and the cellulose of the insoluble fraction is at an amount that is in the range of 15 to 30% by weight of the de-starched corn fiber;

at least 30% by weight of the dissolved hemicellulose has a degree of polymerization of at least 11;

no more than 10% by weight of the dissolved hemicellulose has a degree of polymerization in the range of 3 to 10; and no more than 60% by weight of the dissolved hemicellulose has a degree of polymerization in the range of 1-2.

2. The process of claim 1 further comprising treating the soluble fraction to separate the dissolved hemicellulose from the extraction fluid.

3. The process of claim 1, wherein the at least one weak acid is selected from the group consisting of citric acid, lactic acid, malic acid, acetic acid, fumaric acid, formic acid, oxalic acid, and combinations thereof.

4. The process of claim 1, wherein the extraction mixture has a weight ratio of corn fiber to extraction fluid that is in the range of about 1:100 to about 60:100.

5. The process of claim 4, wherein $T_{SOL}$ is in the range of about 50° C. to about 350° C. and the extraction mixture is at $T_{SOL}$ for a duration, $t_{SOL}$, that is in the range of about 1 minute to about 200 minutes, $T_{QUENCH}$ is in the range of about 5° C. to about 40° C., and the average rate of change from $T_{SOL}$ to $T_{QUENCH}$ during the quenching is in the range of about 0.1° C./s to about 5° C./s.

6. The process of claim 5, wherein the dissolved hemicellulose of the soluble fraction comprises (i) monosaccharides and disaccharides at a total amount that is in the range of about 20 to about 75% by weight of the dissolved hemicellulose, (ii) oligosaccharides at a total amount that is less than about 10% by weight of the dissolved hemicellulose, and (iii) polysaccharides at a total amount that is in the range of about 30 to about 70% by weight of the dissolved hemicellulose.

7. The process of claim 1, wherein the extraction mixture has a weight ratio of corn fiber to extraction fluid that is in the range of about 3:100 to about 20:100.

8. The process of claim 7, wherein $T_{SOL}$ is in the range of about 120° C. to about 150° C. and the extraction mixture is at $T_{SOL}$ for a duration, $t_{SOL}$, that is in the range of about 2 minute to about 10 minutes, $T_{QUENCH}$ is in the range of about 10° C. to about 30° C., and the average rate of change from $T_{SOL}$ to $T_{QUENCH}$ during the quenching is in the range of about 0.5° C./s to about 1° C./s.

9. The process of claim 8, wherein the corn fiber is de-starched corn fiber; the dissolved hemicellulose of the soluble fraction is at an amount that is in the range of about 50 to about 60% by weight of the de-starched corn fiber and the cellulose of the insoluble fraction is at an amount that is in the range of about 20 to about 30% by weight of the de-starched corn fiber; and the dissolved hemicellulose of the soluble fraction comprises (i) monosaccharides and disaccharides at a total amount that is in the range of about 30 to about 40% by weight of the dissolved hemicellulose, (ii) oligosaccharides at a total amount that is less than about 5% by weight of the dissolved hemicellulose, and (iii) polysaccharides at a total amount that is in the range of about 55 to about 70% by weight of the dissolved hemicellulose.

10. A process of claim 1, wherein at least 40% by weight of the dissolved hemicellulose has a degree of polymerization of at least 3.

11. The process of claim 10, wherein: the at least one weak acid is selected from the group consisting of citric acid, lactic acid, malic acid, acetic acid, fumaric acid, formic acid, oxalic acid, and combinations thereof; the extraction fluid has a total concentration of weak carboxylic acids(s) that is in the range of about 0.001 M to about 10 M; the extraction mixture has a weight ratio of de-starched corn fiber to extraction fluid that is in the range of about 1:100 to about 60:100; and the controlling the temperature of the extraction mixture comprises keeping it within a range that is from about 50° C. to about 350° C. for a duration that is in the range of about 1 minute to about 200 minutes and then quenching it to a temperature below than said range.

12. The process of claim 10 further comprising separating the extraction mixture into a soluble fraction comprising dissolved hemicellulose and an insoluble fraction comprising cellulose and lignin from the de-starched corn fiber.

13. The process of claim 12 further comprising separating the dissolved hemicellulose from the extraction fluid.

14. The process according to claim 1, wherein the weak acid has a $pK_a$ greater than 0.

15. The process according to claim 1, wherein the extraction fluid is a mixture of water and the weak acid.

16. The process according to claim 1, wherein the weak acid is citric acid.

17. The process according to claim 1, wherein the weak acid has a $pK_a$ of at least 2.

18. The process of claim 17, wherein $T_{SOL}$ is in the range of about 120° C. to about 150° C. and the extraction mixture is at $T_{SOL}$ for a duration, $t_{SOL}$, that is in the range of about 2 minute to about 10 minutes, $T_{QUENCH}$ is in the range of about 10° C. to about 30° C., and the average rate of change from $T_{SOL}$ to $T_{QUENCH}$ during the quenching is in the range of about 0.5° C./s to about 1° C./s.

19. The process of claim 18, wherein the extraction mixture does not comprise any strong acids.

20. The process of claim 17, wherein the extraction mixture does not comprise any strong acids.

21. The process of claim 1, wherein the weak acid has a $pK_a$ of at least 4.

22. The process of claim 21, wherein $T_{SOL}$ is in the range of about 120° C. to about 150° C. and the extraction mixture is at $T_{SOL}$ for a duration, $t_{SOL}$, that is in the range of about 2 minute to about 10 minutes, $T_{QUENCH}$ is in the range of about 10° C. to about 30° C., and the average rate of change from $T_{SOL}$ to $T_{QUENCH}$ during the quenching is in the range of about 0.5° C./s to about 1° C./s.

23. A process of separating one or more components of de-starched corn fiber, the process comprising solubilizing and dissolving hemicellulose from the de-starched corn fiber into an extraction fluid of an extraction mixture, which comprises about 6.5 parts by weight of de-starched corn fiber and about 100 parts by weight of the extraction fluid, wherein the extraction fluid comprises citric acid at a concentration in the range of about 0.01 M to about 0.05 M by controlling the temperature of the extraction mixture so that it is in the range of about 120° C. to about 150° C. for a duration in the range of about 2 minutes to about 10 minutes and then quenching it to a temperature below said range so that (a) the amount of dissolved hemicellulose is in the range of about 50 to about 60% by weight of the de-starched corn fiber, (b) the dissolved hemicellulose comprises (i) monosaccharides and disaccharides at a total amount that is in the range of about 30 to about 40% by weight of the dissolved hemicellulose, (ii) oligosaccharides at a total amount that is less than about 5% by weight of the dissolved hemicellulose, and (iii) polysaccharides at a total amount that is in the range of about 55 to about 70% by weight of the dissolved hemicellulose.

24. A process of separating one or more components of corn fiber, the process comprising:
(a) contacting the corn fiber, which comprises a matrix that comprises hemicellulose, cellulose and lignin, with an extraction fluid that comprises at least one weak acid to form an extraction mixture, the extraction mixture having a total concentration of weak acid(s) that is in the range of about 0.01 M to about 1 M, the extraction mixture having a weight ratio of corn fiber to extraction fluid that is in the range of about 3:100 to about 20:100;
(b) solubilizing hemicellulose of the corn fiber by controlling the temperature of the extraction mixture so that the extraction fluid is sufficiently acidic to break linkages between hemicellulose and lignin via hydrolysis, $T_{SOL}$, thereby dissolving the solubilized hemicellulose into the extraction fluid;
(c) quenching hydrolysis by controlling the temperature of the extraction mixture so that the extraction fluid is not sufficiently acidic to substantially depolymerize the dissolved hemicellulose, $T_{QUENCH}$, and
(d) separating the extraction mixture into a soluble fraction comprising dissolved hemicellulose and an insoluble fraction comprising cellulose,
wherein $T_{SOL}$ is in the range of about 120° C. to about 150° C. and the extraction mixture is at $T_{SOL}$ for a duration, $t_{SOL}$, that is in the range of about 2 minute to about 10 minutes, $T_{QUENCH}$ is in the range of about 10° C. to about 30° C., and the average rate of change from $T_{SOL}$ to $T_{QUENCH}$ during the quenching is in the range of about 0.5° C./s to about 1° C./s.

25. The process of claim 24, wherein the corn fiber is de-starched corn fiber; the dissolved hemicellulose of the soluble fraction is at an amount that is in the range of about 50 to about 60% by weight of the de-starched corn fiber and the cellulose of the insoluble fraction is at an amount that is in the range of about 20 to about 30% by weight of the de-starched corn fiber; and the dissolved hemicellulose of the soluble fraction comprises (i) monosaccharides and disaccharides at a total amount that is in the range of about 30 to about 40% by weight of the dissolved hemicellulose, (ii) oligosaccharides at a total amount that is less than about 5% by weight of the dissolved hemicellulose, and (iii) polysaccharides at a total amount that is in the range of about 55 to about 70% by weight of the dissolved hemicellulose.

* * * * *